United States Patent
Kerboeuf et al.

(10) Patent No.: US 6,736,554 B2
(45) Date of Patent: May 18, 2004

(54) LOW-STRESS INTERNAL STRUCTURE FOR OPTOELECTRONIC HOUSING

(75) Inventors: Sylvaine Kerboeuf, L'Hay les Roses (FR); Emmanuel Grard, St Michel sur Orge (FR); Claude Artigue, Bourg la Reine (FR); Pierre Jean Laroulandie, Le Kremlin Bicetre (FR); Alwin Goeth, Allemagne (DE); Klaus Adam, Allemagne (DE)

(73) Assignee: Avanex Corp., Fremont, CA (US)

( * ) Notice: Subject to any disclaimer, the term of this patent is extended or adjusted under 35 U.S.C. 154(b) by 136 days.

(21) Appl. No.: 10/130,700

(22) PCT Filed: Oct. 4, 2001

(86) PCT No.: PCT/FR01/03057

§ 371 (c)(1),
(2), (4) Date: May 22, 2002

(87) PCT Pub. No.: WO02/29464

PCT Pub. Date: Apr. 11, 2002

(65) Prior Publication Data

US 2002/0172473 A1 Nov. 21, 2002

(30) Foreign Application Priority Data

Oct. 5, 2000 (FR) .............................................. 00 12729

(51) Int. Cl.$^7$ ................................................. G02B 6/36
(52) U.S. Cl. .......................................... 385/92; 385/94
(58) Field of Search ............................. 385/92, 94, 88, 385/89, 14

(56) References Cited

U.S. PATENT DOCUMENTS

| 5,327,517 A | | 7/1994 | Yamada et al. | |
|---|---|---|---|---|
| 5,420,952 A | * | 5/1995 | Katsura et al. | 385/80 |
| 5,422,971 A | * | 6/1995 | Honjo et al. | 385/80 |
| 5,430,821 A | * | 7/1995 | Sasoka et al. | 385/99 |
| 5,923,803 A | * | 7/1999 | Bunin et al. | 385/80 |

FOREIGN PATENT DOCUMENTS

| DE | 196 43 072 A1 | 4/1998 |
|---|---|---|
| EP | 0 525 743 A1 | 2/1993 |
| EP | 0 939 328 A2 | 9/1999 |
| GB | 2 026 194 A | 1/1980 |
| WO | WO 96 00920 | 1/1996 |

* cited by examiner

Primary Examiner—John R. Lee
Assistant Examiner—Paul M. Gurzo
(74) Attorney, Agent, or Firm—Wilson Sonsini; Goodrich & Rosati

(57) ABSTRACT

In an optoelectronic module (1) comprising a plastics material package (2) accommodating a base (8) fixed to the package (2) and supporting an optical component (9) coupled by an optical fiber (5) to an optical connector (4) of the package (2), fiber displacements associated with thermal stresses are avoided by mounting the base so that it floats on the package (2) and possibly the connector (4). The floating mounting of the base (8) is obtained by using for fixing the base one or more adhesives (13, 14) having a greater elasticity than the adhesives used to fix each of the two ends (6, 7) of the fiber (5) to the base (8) and the connector (4), respectively.

6 Claims, 2 Drawing Sheets

LOW-STRESS INTERNAL STRUCTURE FOR OPTOELECTRONIC HOUSING

DESCRIPTION

1. Field of the Invention

The invention lies in the field of optoelectronic packages or modules, in particular the field of plastics material packages. It relates to a method of fixing an optoelectronic component support base included in the package.

2. Technological Background

An optoelectronic module comprises a package from which emerge optical and electrical connections for connecting the package to other modules, for example, or to a structure accommodating a set of modules.

The package accommodates a base, for example made of silicon, Kovar or possibly another metal. If the package is of metal, for example, the base can be welded or glued to the package. The base has a surface fixed to the bottom of the package or to a connector or to the bottom of the package and to a connector. The base can include silica surface portions, the silica portion accommodating portions forming a waveguide for a light wave. The base can include grooves, for example V-shaped or U-shaped grooves, etched into the surface and whose function is to facilitate the positioning of an optical fiber.

Optoelectronic components, for example, a laser diode and possibly other optical items such as lenses are mounted on one or more faces of the base, for example on a face of the base opposite the face disposed against the bottom of the package. Hereinafter the expression "optical component" will refer to any optical component, whether it is an active component such as a laser or a passive component such as a coupling lens or a waveguide, in particular a silica waveguide integrated into the base, as indicated above. The optical connection of an optical component is effected by means of a connector integrated into the package. The connector receives one end of an optical fiber. The other end of the fiber faces the optical component, with the result that an optical signal can pass from the fiber to the component or from the component to the fiber.

The assembly sequence for a module necessitates fixing the fiber at both ends. For a plastics material module, the fiber is first fixed with an adhesive into a groove in the base, for example a V-shaped groove, facing an optical component. The other end of the fiber is then fixed into the connector and at the same time the base is fixed to a bottom of the package or to the connector or to the bottom of the package and the connector, using the same adhesive.

The fiber is subjected to shocks or thermal cycling during the assembly of the various portions of the package and during the use of the module. It follows that expansion stresses are induced in the fiber because of the different coefficients of thermal expansion of the various portions constituting the equipped package assembly.

These stresses on the fiber can cause displacements of the ends of the fiber, in particular of the end facing the optical component, and thus a loss of optical coupling between the fiber and the optical component. As a general rule, in optoelectronic packages, the fiber length is of the order of ten centimeters. With a length of this magnitude, it is possible to provide a curvature to absorb differential expansion.

On the other hand, in technologies using surface mounting of components (SMT), which generally employ more compact packages, the fiber length is of the order of 2 cm. In this case it is no longer possible to use a curvature to absorb differential expansion. It is therefore necessary to find some other assembly solution so that the ends of the fiber remain at their nominal location despite the stresses of thermal origin, and this applies in particular to the end facing the optical component.

BRIEF DESCRIPTION OF THE INVENTION

According to the inventors, the source of the stress exerted on the fiber, leading to displacement of the end facing, for example, the optical component and possibly the other end, originates essentially from the differential expansion of, on the one hand, the silica fiber and, on the other hand, other items, such as the bottom of the package, the connector, and the base, made of plastics material, silicon, Kovar, or another metal. The expansion of the package, the connector or the base applies a tension stress to the fiber. This stress can lead to displacement of at least one end of the fiber, and in particular of the end facing the optoelectronic component. The positioning tolerances for good optical coupling of that end are generally closer than the positioning tolerances for the end connected to the connector.

In the method of assembling a module in accordance with the invention the two ends of the fiber are fixed to the base and to the connector in a manner that is less deformable than the connection of the base to the bottom of the package or to the connector or to the bottom of the package and to the connector. This relieves the stress of thermal origin exerted on the fiber, enabling the base to move relative to the items to which it is itself fixed, for example the bottom of the package, the connector or both.

To obtain this result, it is sufficient for the adhesive connecting the base and the items to which it is itself fixed to be more elastic than the adhesive used to fix at least one end and preferably both ends of the fiber. This means that the elongation at the threshold of plasticity of the adhesive connecting the base and the items to which it is itself fixed is higher than the elongation at the threshold of plasticity of the adhesive fixing at least one end of the fiber.

To summarize, the invention relates to an optical module including a package having a bottom and accommodating:

a base on which is mounted an optical component, and an optical connector, the connector and the component being coupled by an optical fiber having two ends of which one end is fixed by an adhesive to the base in front of the optical component and the other end is fixed by an adhesive to the connector, the base being fixed to the bottom of the package or to the connector or to the bottom of the package and to the connector by an adhesive, which module is characterized in that the adhesive for fixing the base has an elongation at the threshold of plasticity greater than the elongation at the threshold of plasticity of the adhesive for fixing at least one end of the fiber to the base or the connector.

With this feature, the adhesive or adhesives fixing the base are deformed more for the same stress than the adhesive or adhesives fixing the ends of the fiber. As a result the base moves for a lower level of stress than that which causes the ends of the fiber to move, which relieves the stress on the fiber.

The deformation at the threshold of plastic deformation of the adhesive connecting the base is preferably from 10 to 100 times greater than that of the adhesive fixing the fiber.

As a general rule, this will imply that the Young's modulus of the adhesive fixing the base is very much less than, for example less than one third of, the Young's modulus of the adhesive fixing the ends of the optical fiber.

Of course, the fact that the connector and the base are coupled by an optical fiber does not exclude the situation in which the connector and the base are coupled by several optical fibers, for example 4, 8 or 16 optical fibers. Similarly, the package can include several bases or several connectors.

BRIEF DESCRIPTION OF THE DRAWINGS.

Embodiments of the invention will now be commented on with reference to the accompanying drawings, in which.

DESCRIPTION OF EMBODIMENTS

Figure 1:
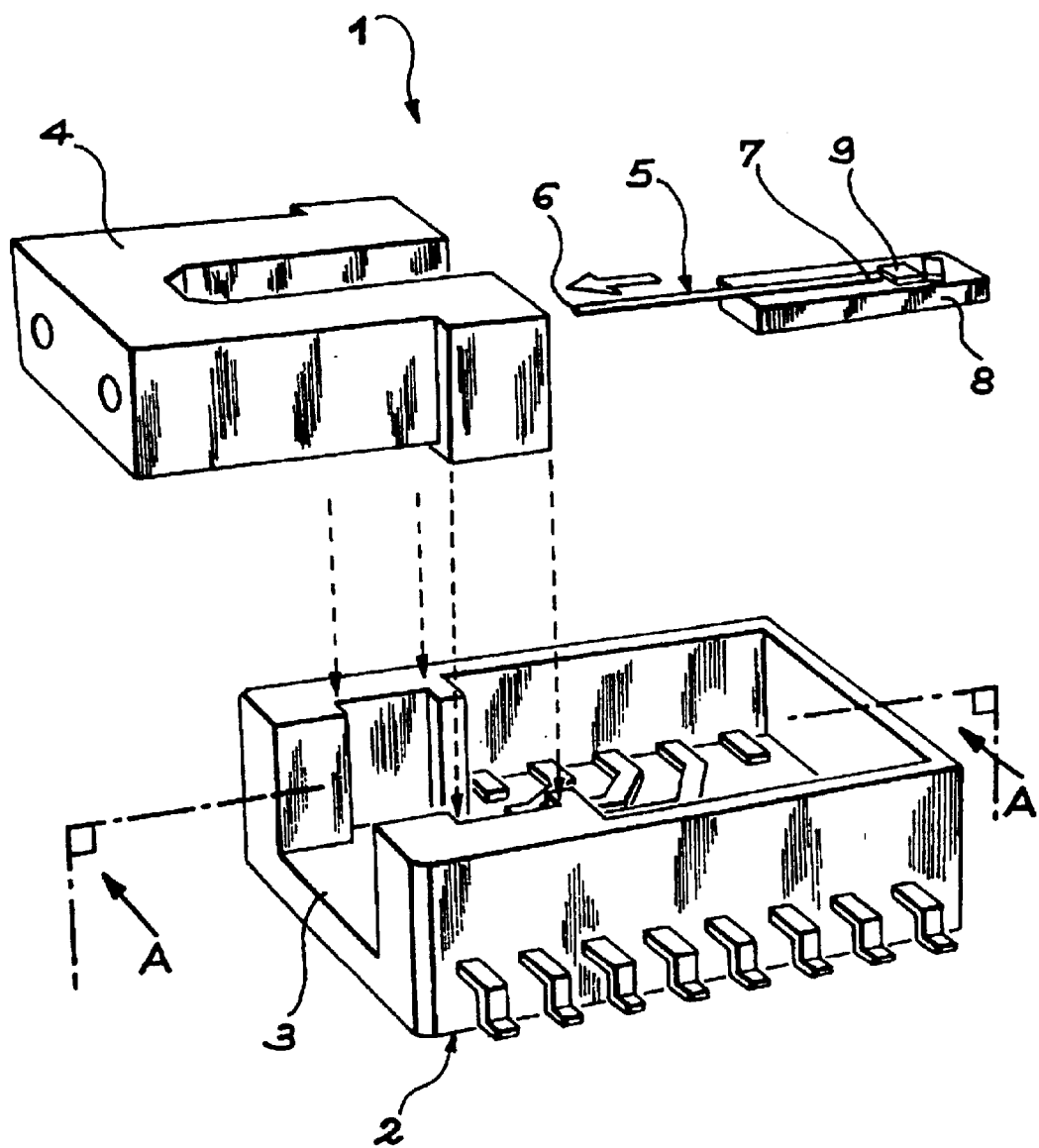
FIG. 1 represents an exploded perspective view of an optoelectronic package.

FIG. 1 represents an exploded view of an optoelectronic module 1 including, on the one hand, a package 2 having a bottom 3, and, on the other hand, a connector 4 that is inserted into the package 2 in the manner indicated by the vertical arrows, the bottom of the connector 4 being fixed to the bottom 3 of the package 2. The package also includes a base 8 whose bottom face is fixed to the bottom 3 of the package 2 and whose top face, i.e. the face opposite the face fixed to the bottom 3 of the package 2, supports an optical component 9. The optical component 9 is connected by an optical fiber 5 to the connector 4. The fiber has two ends 6 and 7. The end 6 is fixed to the connector 4 and the end 7 is fixed to the base 8 opposite an optical component 9. The base 8 is inserted into a hollow portion of the connector 4 and the optical fiber 5, to be more precise its end 6, is fixed into a housing of the connector 4 in the direction indicated by a horizontal arrow. The assembly comprising the base 8 carrying the optical component 9, the optical fiber 5 and the connector 4 is assembled into the package 2, as indicated by the vertical arrows. The figure also shows connections that are not identified by reference numbers because they are not directly relevant to the invention.

The module as represented in and described with reference to FIG. 1 is no different from a prior art module. It will emerge hereinafter, in connection with FIGS. 2 and 3, that the difference between a prior art module and a module according to the invention stems from the fixing means, i.e., generally speaking, from the adhesives employed to fix the base 8 to the package 2 or possibly to the connector 4. According to the invention, the elastic force generated by the deformation of the layer or areas of adhesive fixing the base 8 to the package 2 or possibly to the connector 4 remain lower than the stress necessary to displace one end 6, 7 of the fiber 5. Thus the invention can employ all prior art configurations in which the base and the ends of the fiber are fixed by means of an adhesive. In particular, the base 8 can optionally include a groove for positioning and retaining the fiber. The base 8 can be fixed only to the bottom 3 of the package 2, or partly to the bottom 3 and partly to the connector 4, or only to the connector 4.

Figure 2:
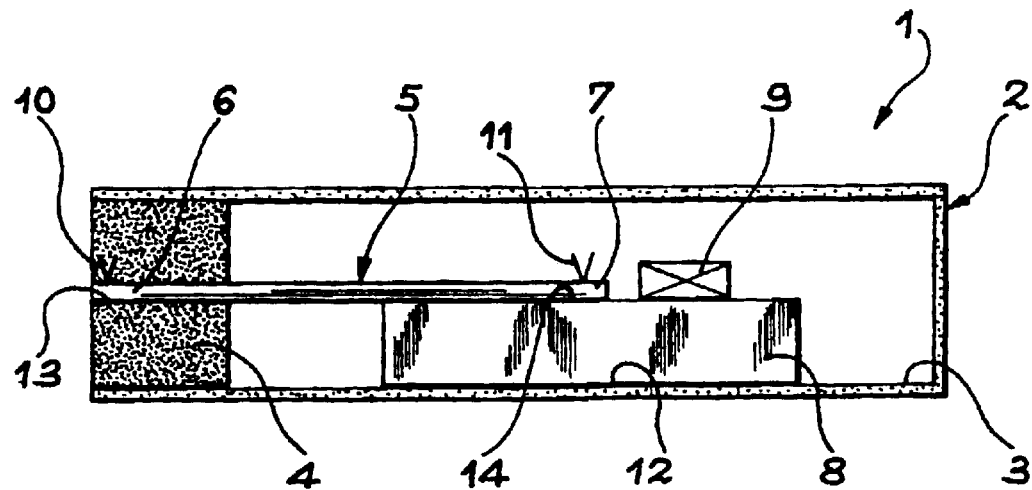
FIG. 2 represents an optoelectronic package identical to or similar to that shown in FIG. 1, in longitudinal section taken along the line A—A in FIG. 1.

FIG. 2 represents in longitudinal section a package 2 identical or similar to that shown in FIG. 1. In this figure, as in the next figure, components identified by the same reference numbers as those described in connection with FIG. 1 will not necessarily be commented on. The package 2 is equipped with a connector 4 and a base 8 carrying the optical component 9. The optical fiber 5 has an end 6 fixed to the connector 4 and an end 7 fixed to the base 8. This figure shows a situation in which the base 8 rests only on the bottom 3 of the package 2. The manner in which the optical fiber 5 is fixed, on the one hand, to the base 8 and, on the other hand, to the connector 4 will be described in connection with this figure. How the base 8 is fixed to the bottom 3 of the package 2 will also be described. V-shapes 10 and 11 symbolize the fact that the ends 6 and 7, respectively, of the fiber are fixed in such a manner that the fiber does not move relative to the connector 4 and the base 8, respectively. The base 8 is fixed to the package 2 by an adhesive 12. The layer of adhesive 12 between the base 8 and the bottom 3 of the package 2 can be a continuous or discontinuous layer. According to an important feature of the invention, the glue fixing the base 8 to the bottom 3 of the package 2 has an elongation at the threshold of plasticity of the order of 20% or more. As a general rule this is reflected in a low Young's modulus, for example less than 2 000 MPa. On the other hand, the adhesive used to fix at least one end 6 or 7 of the fiber 5 or both ends 6 and 7 to the connector 4 and to the base 8, respectively, has an elongation at the threshold of plasticity of the order of 2% or less. As a general rule, this kind of adhesive has a high Young's modulus, for example equal to or greater than 7 000 MPa.

Accordingly, the adhesive used to fix the base 8 to the bottom 3 of the package 2 or to the bottom 3 of the package 2 and to the connector 4 or only to the connector 4 has an elongation at the threshold of plasticity from 10 to 100 times greater than the elongation at the threshold of plasticity of the adhesive used to fix at least one end or both ends 6, 7 of the optical fiber 5 to the connector 4 or to the base 8, respectively.

The adhesive 14 used to fix the end 7 of the fiber 5 to the base 8 can be a UV epoxy adhesive, i.e. an adhesive that is crosslinked by exposure to ultraviolet light. The adhesive 13 used to fix the end 6 of the optical fiber into the connector 4 can be a hard thermal epoxy adhesive. The adhesives 13 and 14 must preferably have high glass transition temperatures $T_g$, at least higher than the temperature at which the module is used. The adhesive 12 used to fix the base 8 to the bottom 3 of the package 2 can be a flexible epoxy adhesive.

Because of the difference in the elasticity of the adhesives 12, 13 and 14, the base 8 is mounted so that it floats on the bottom 3 of the package 2, so to speak, with the result that a stress due to shocks or thermal cycling will be reflected in a displacement of the entire base 8. On the other hand, the optical fiber 5, which is mounted more rigidly on the base 8 and the connector 4, will remain firmly fixed in place and there will be no displacement of the fiber relative to the component 9 or the connector 4.

Figure 3:
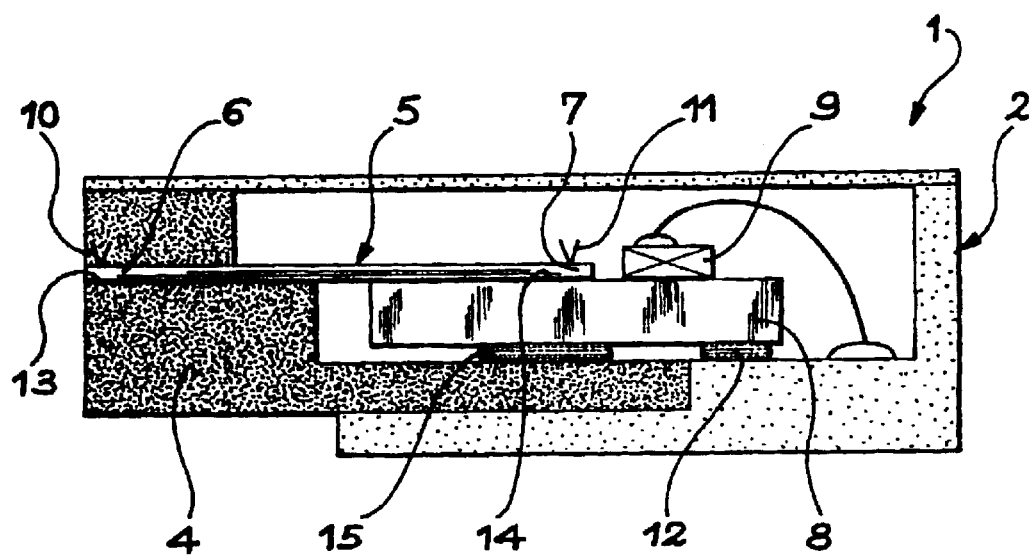
FIG. 3 represents another embodiment of an optoelectronic package identical to or similar to that shown in FIG. 1, in longitudinal section taken along the same line A—A in FIG. 1.

FIG. 3 represents another embodiment in which the connector 4 has a portion fixed to the bottom 3 of the package 2. The base 8 rests partly on the bottom 3 of the package 2 and partly on a bottom of the connector 4. In the example represented, the base 8 is fixed by means of an adhesive 12 to the bottom 3 of the package 2 and by an adhesive 15 to the connector 4. In this case, each of the adhesives 12 and 15 has a deformation at the threshold of plasticity from 10 to 100 times greater than the deformation at the threshold of elasticity of each of the adhesives 13 and 14 used to fix the ends 6 and 7 of the fiber 5 to the connector 4 and to the base 8, respectively. The adhesives 12 and 15 will preferably be identical to minimize procurement and manipulation. The adhesives 13 and 14 can be identical or different as a function of their mode of polymerization. The areas in which the adhesives 12 and 15 are distributed make the base 8 float both with respect to the package 2 and with respect to the connector 4. The adhesives employed can be those described in connection with FIG. 2.

In some arrangements the base 8 is fixed or rests only on the connector 4. This situation has not been represented in the figures. It is deduced from the situation represented in FIG. 3, for example, simply by eliminating the adhesive 12, or by the fact that the base 8 rests entirely on the connector 4.

The invention is of particular benefit when the package 2 is a plastics material package having a coefficient of thermal expansion much higher than the coefficient of thermal expansion of the base.

What is claimed is:

1. An optical module (1) including a package (2) having a bottom (3) and accommodating:
   a base (8) on which is mounted an optical component (9), and
   an optical connector (4),
the connector (4) and the component (9) being coupled by an optical fiber (5) having two ends (6, 7) of which one end (7) is bonded by a first adhesive (14) to the base (8) in front of the optical component (9) and the other end (6) is bonded by a second adhesive (13) to the connector (4), the base (8) being bonded to the bottom (3) of the package (2) or to the connector (4) or to the bottom (3) of the package (2) and to the connector (4) by a third adhesive (12) and possibly a fourth adhesive (15), which module is characterized in that an adhesive (12, 15) for fixing the base (8) has an elongation at the threshold of plasticity greater than the elongation at the threshold of plasticity of an adhesive (13, 14) for fixing at least one end (6, 7) of the fiber (5) to the base (8) or the connector (4).

2. An optical module (1) according to claim 1, characterized in that the elongation at the threshold of plasticity of an adhesive (12, 15) for fixing the base (8) is from 10 to 100 times greater than the elongation at the threshold of plasticity of an adhesive (13, 14) for fixing at least one end (6, 7) of the fiber (5) or the base (8) or the connector (4).

3. An optical module (1) according to claim 2, characterized in that the elongation at the threshold of plasticity of each of the adhesives (12, 15) for fixing the base (8) is from 10 to 100 times greater than the elongation at the threshold of plasticity of each of the adhesives (13, 14) for fixing at least one end (6, 7) of the fiber (5) to the base (8) or the connector (4).

4. An optical module (1) according to claim 1, characterized in that each of the adhesives (12, 15) for fixing the base (8) has a Young's modulus very much lower than that of each of the adhesives (13, 14) for fixing each of the ends (6, 7) of the optical fiber (5) to the connector (4) and to the base (8), respectively.

5. An optical module according to claim 4, characterized in that each of the adhesives (12, 15) for fixing the base has a Young's modulus less than one third that of each of the adhesives for fixing each end (6, 7) of the optical fiber (5).

6. An optical module (1) according to claim 1, wherein the base (8) is fixed not only to the package (2) but also to the connector (4), characterized in that each of the adhesives (12, 15) for fixing the base (8) to the package (2) and the connector (4), respectively, has an elongation at the threshold of plasticity greater than the elongation at the threshold of plasticity of the adhesive for fixing at least one end (6, 7) of the fiber (5) to the base (8) or the connector (4).

* * * * *